United States Patent Office 3,264,892
Patented August 9, 1966

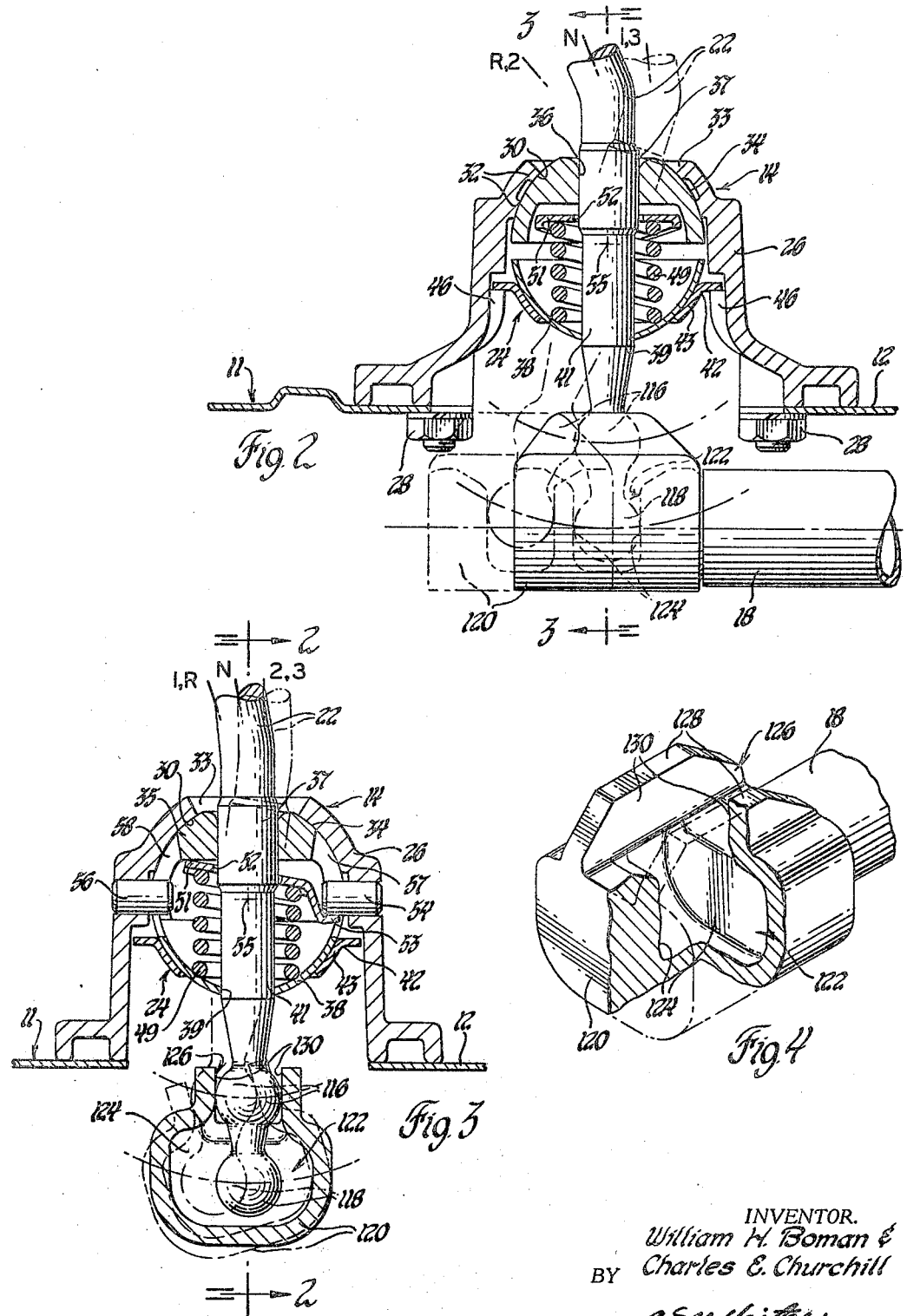

3,264,892
TRANSMISSION CONTROL LINKAGE
William H. Boman, Birmingham, and Charles E. Churchill, Farmington, Mich., assignors to General Motors Corporation, Detroit, Mich., a corporation of Delaware
Filed Sept. 24, 1964, Ser. No. 399,058
8 Claims. (Cl. 74—473)

This invention relates to controls and more particularly to a control linkage for selectively conditioning a transmission.

In vehicles where the transmission is conditioned by selective operation of a single rotatable and reciprocable control rod through manipulation of a remotely located universally pivoted transmission control lever, the linkage connecting the control rod and lever must be capable of imparting both rotary and linear movement to the control rod. While the conventional linkages employed for imparting both rotary and linear movement to the control rod have proven generally satisfactory, they often do not meet the required standards of unrestrained motion transmittal.

The principle of this invention lies in a shifting pivotal connection between a control lever and a controlled rod which is supported for rotation and linear axial movement which during rotary movement locates the pivotal connection spaced from the axis and during linear movement locates the pivotal connection substantially on the axis. As used in transmission controls the control lever which is universally pivoted for movement about a point spaced from the controlled rod axis has a pair of spherical portions located at different radii from the pivot and received in a double socket member on the controlled rod. The socket receiving the spherical portion at the larger radius locates this spherical portion in line with the controlled rod axis when the controlled rod is in its neutral position and cooperates only through engagement with this spherical portion to impart linear movement to the controlled rod upon pivoting of the control lever in the directions of linear movement of the controlled rod. This manner of connection provides highly efficient motion transmittal for transmission shifting since the points of engagement of the spherical portion at the larger radius are always in close proximity to the control rod axis, the spherical portion at the smaller radius being permitted to move freely in its socket during such shifting. The socket receiving the spherical portion at the smaller radius locates this spherical portion at a point radially spaced from the controlled rod axis in its neutral position and cooperates only through engagement with this spherical portion to transmit rotary movement to the controlled rod upon pivoting of the transmission control lever in directions causing arcuate movement of this spherical portion about the controlled rod axis. This latter manner of connection provides highly efficient motion transmittal for transmission shifting since the spherical portion at the larger radious moves freely in its socket during such shifting.

An object of this invention is to provide in a transmission control, linkage operable to translate pivotal movement of a lever into rotary movement of a control rod about its axis through a pivot spaced from its axis and also to translate pivotal movement of the lever into linear movement of the control rod through a pivot to act always at least substantially in line with the control rod axis.

Another object of this invention is to provide in a transmission control, linkage operatively connecting a universally pivoted transmission control lever to a rotatably and reciprocally supported transmission controlled rod and maintaining the points of connection at least substantially in line with the controlled rod axis when imparting linear motion and radially spaced from the controlled rod axis when imparting rotary motion.

Another object of this invention is to provide in a transmission control, a transmission having a control rod, a universally pivoted shift lever remote from the transmission and a double ball and socket linkage connection connecting the lever and control rod with one ball and socket providing a rolling contact connection always at least closely in line with the control rod axis only throughout the imparting of linear motion to the control rod and with the other ball and socket providing a rolling contact connection radially spaced from the control rod axis only throughout the imparting of rotary motion to the control rod.

These and other objects of the invention will be more apparent from the following description and drawing of a preferred embodiment of the invention.

FIG. 2 is a section on the line 2—2 of FIGURE 3 showing the linkage connecting the transmission control lever and the controlled rod.

FIGURE 3 is a section on the line 3—3 of FIGURE 2 showing the linkage connecting the transmission control lever and the controlled rod.

FIGURE 4 is the perspective view of the linkage on the end of the controlled rod.

Figure 1:
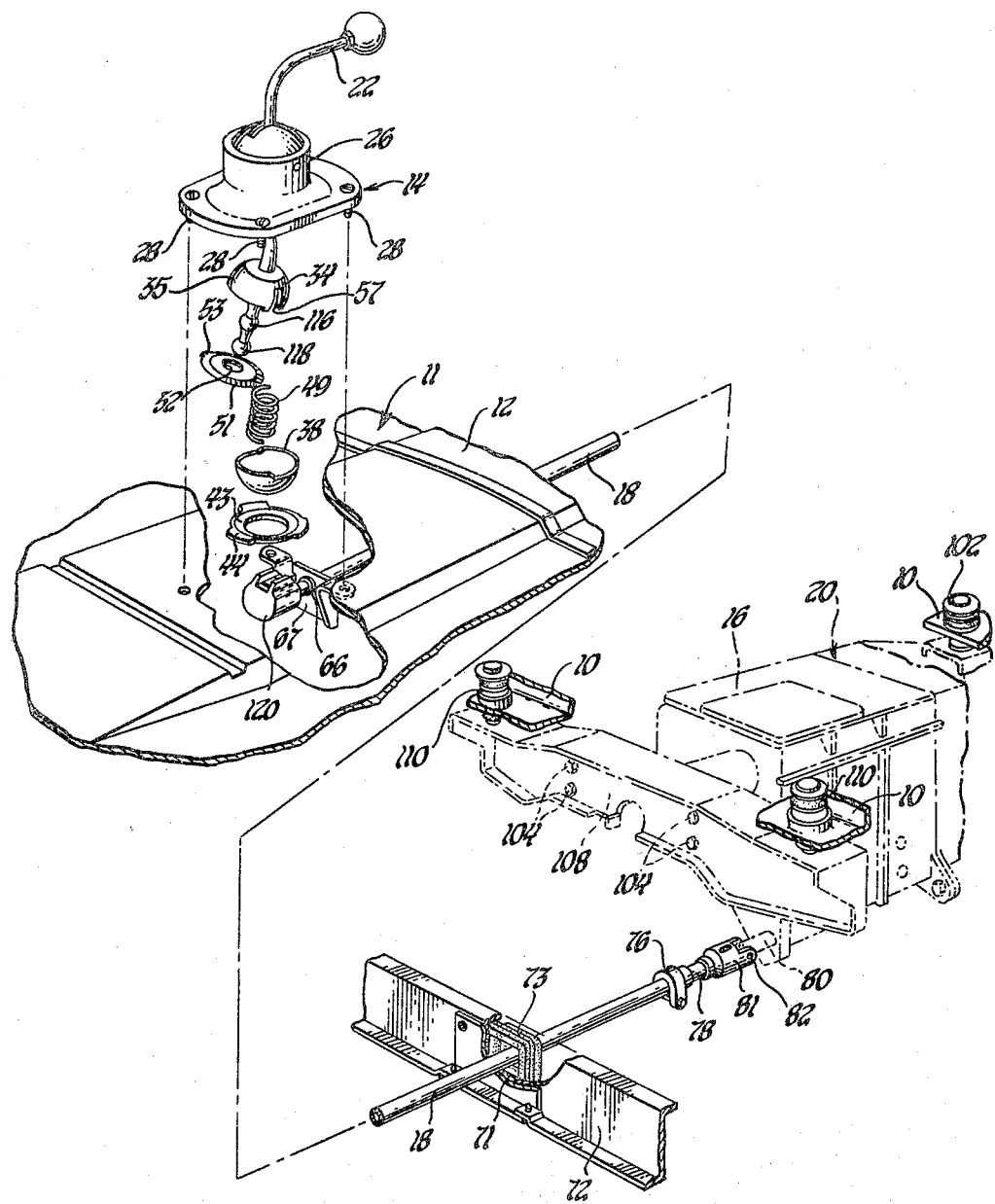
FIGURE 1 illustrates the complete transmission control assembly and shows parts of the vehicle, the transmission and an expanded view of the transmission control lever.

The transmission control made in accordance with this invention is primarily intended for use in transmission control systems of the type disclosed in United States Patent No. 3,064,493 to George Popovich to which reference may be made for a complete description of this type of transmission control system.

Referring first to FIGURE 1, there is shown parts of a vehicle body 10 having a floor 11 with a raised central portion or tunnel 12 which extends longitudinally of the vehicle from the driver's compartment in the forward portion of the vehicle where the gear shift lever mechanism 14 is located in the rear of the vehicle adjacent the transmission 16. The gear shift lever is connected by a control rod 18 to operate the transmission 16 which is a part of a unitary assembly generally designated at 20 consisting of the transmission 16, a differential and an engine as shown in detail in United States Patent No. 3,101,010 to George Popovich. This assembly is mounted on the vehicle body 10 as shown in detail in United States Patent No. 2,988,162 to Kai H. Hansen.

Referring to FIGURES 1, 2 and 3, the gear shift assembly has a shift lever 22 pivotally mounted in a universal joint 24 and connected to the control rod 18 to reciprocate control rod 18 in response to fore and aft or longitudinal movement of the lever and to rotate control rod 18 in response to transverse movement of the lever, as will be explained in detail later. The universal joint 24 consists of a support portion 26 secured to the central portion 12 of floor 11 by bolts 28. The support 26 has adjacent its upper end a spherical seat portion 30 consisting of a pair of annular ribs 32 having the surface of annular segments of a sphere and having a central aperture 33 to receive the gear shift lever 22. The upper semispherical portion 34 of the ball has a central aperture 36 which is press fitted and thus secured on an enlargement 37 of lever 22. The outer spherical surface of the upper half 34 of the ball engages the spherical seat surfaces 32 for universal movement. The lower portion of the ball is formed by a stamped semispherical member 38 having an aperture 39 which receives the lower portion 41 of lever 22 and slides on the lever. The lower portion of the socket is formed by a stamped member 42 having a spherical seat portion 43 and a plurality of spaced bayonet lugs 44 which in the assembled position shown rest on cooperating bayonet lugs 46 formed on the inside of the surface of the support 26. The member 42 is inserted with the lugs 44 passing through the recesses between lugs 46 and turned to the locking positions. The ball joint 24 is held in the assembled position shown with the upper and lower ball members 34 and 42 resiliently biased to engage spherical seat portions 32 and 43 by a spring 49 which engages the lower ball member 38 and which, through a washer 51, always engages the upper ball member. The washer 51 which is a cam member has a central aperture 52 through which the lever 22 passes to permit free tilting movement of the member 51 relative to the lever and at one side a downwardly and radially outwardly extending cam lug 53 as best shown in FIGURE 3 which engages a pin 54 secured in an aperture in the support 26 and extending through slot 57 to the interior of the hollow upper ball. The cam lug 53 operates in conjunction with the pin or cam member 54 to bias the shift lever 22 to pivot about its pivot point 55 to the third position. The pin 54 and a pin 56 cooperate with vertical slots 57 and 58 in the ball member 34 to prevent rotation about a vertical axis of the ball relative to the ball socket.

The control rod 18 is rotatably and reciprocally supported as shown in FIGURE 1 by a nylon bushing 66 secured to a bearing bracket 67 which is mounted on the underside of the floor 11 by the rear bolts 28 which also secure the support 26 to the floor 11 and located within the tunnel to provide the only support directly on the vehicle body for the control rod 18.

The control rod extends through the tunnel and through an aperture 71 in a rear support member 72 which provides a closure for the rear end of the tunnel as shown in FIGURE 1. A boot or corrugated flexible member 73 tightly fits the control rod 18 and is secured and sealed by a grooved collar within an aperture in the frame 72 to provide a dirt seal at the rear end of the tunnel.

To provide an axial adjustment, control rod 18 which is preferably tubular is securely clamped at selected points along its axis by a clamp device 76 to a spline coupled rod 78. The rod 78 is connected to the transmission's control rod 80 by a vibration damper 81 as shown in detail in Patent 3,064,493 which has a pair of ears through which a pin 82 extends and is received by an accommodating aperture in rod 80 to provide a pivot connection between rods 78 and 80.

The unitary assembly 20 is mounted on a single centrally located cushion mounting 102 secured to the vehicle body 10. At the front, the transmission 16 and the unit are secured by bolts 104 connecting the transmission housing to a cross member 108 secured by a pair of cushion mountings 110 to the body 10. This arrangement which provides a three point engine mounting has a long longitudinal distance between the fore and aft motor mounts to obtain better vibration damping for the unit 20 which includes the engine. The complete details of this mounting are shown in Patent 2,988,162. The cross member 108 is secured to the lower portion of the front housing face of the transmission 16, and thus the control rod 80 is located parallel with and closer to the axis of the vibration damping movement of the unit 20 permitted by the cushion mounting so that this movement only moves the rod 80 less than the movement of cushions 110 and thus does not interfere with the operation of the transmission control linkage.

The transmission 16 provides gearing for three forward speeds and reverse, the complete details of which are shown in Patent 3,064,493. Gear shifting is accomplished through manipulation of the transmission control rod 80 by rotating the rod from its neutral position in one direction to the first reverse position where fore and aft movement is effective to shift to the first and reverse ratios respectively and rotation of the rod in the opposite direction to the second third position where fore and aft movement is effective to shift to the first and third ratios respectively.

To provide a connection between the shift lever 22 and the control rod 18 and connected transmission control rod 80 to translate the pivotal movements of lever 22 into the movements required of control rod 18 for shifting, the lower end of shift lever 22 is provided with two spherical portions 116 and 118 located at different radial distances from the pivot point 55 of the lever. A double socketed member 120 is rigidly secured to the end of control rod 18 on the forward side of bracket 67 and has a socket 122 whose opposing side walls 124 are parallel to each other, extend at right angles to the control rod axis and engage with the lower spherical portion 118 as best shown in FIGURE 2. The second socket 126 of the member 120 is provided by a pair of ears 128 having opposing side walls 130 which are parallel to each other, extend in the axial direction of the control rod 18 and engage with the upper spherical portion 116 as best shown in FIGURE 3.

The upper spherical portion 116 cooperates with the side walls 130 of the raised ears 128 to provide a shifting pivotal connection between lever 22 and rod 18 to translate rotational movement to the control rod 18 and connected rod 80 upon lateral pivotal movement of the lever 22 from neutral (N) to the first reverse position (1–R) and the second third position (2–3) as shown in FIGURE 3. The lower spherical portion 118 is capable of up and down or vertical movement in its socket 122 and by engagement with the walls 124 also provides a shifting pivotal connection between lever 22 and rod 18 to effect fore and aft linear movement of the control rod 18 and connected rod 80 upon fore and aft pivotal movement of lever 22 from the first reverse position (1–R) to first (1) and reverse (R) and from the second–third position (2–3) to second (2) and third (3) as shown in FIGURE 2. Binding in bushing 66 is prevented during this latter shifting since the points of shifting pivotal connection provided by contact of the spherical portion 118 with the side walls 124 are always in close proximity to the control rod axis keeping the force couples low to provide for the smooth control rod operation.

The internal dimensions of the socket 122 in directions transverse of the control rod axis are large enough to permit free movement of the lower spherical portion 118 when the lever 22 is pivoted to effect the rotational movement of the control rod. The axially extending socket 126 permits free movement of the upper spherical portion 116 when the lever 22 is pivoted to effect the linear movement of the control rod 18. These shifting ball and socket pivotal connections also reduce vibratory movement in the vertical plane transmitted from the transmission to the shift lever because of the freedom of movement of the balls in their sockets in the vertical direction.

It will be appreciated that the above-described preferred embodiment of the invention may be modified within the scope of the appended claims.

We claim:

1. In a control linkage, a lever support, a rod support, a control lever pivotally supported by said lever support for universal pivotal movement about a pivot point, a controlled rod supported by said rod support for rotary movement and for linear movement in one path of control lever movement, first movement translating means for translating pivotal movement of said control lever into rotary movement of said controlled rod and second movement translating means spaced from said first movement translating means on said controlled rod and said control lever for translating pivotal movement of said control lever into linear movement of said controlled rod.

2. In a control linkage, lever support, a rod support, a control lever supported by said lever support for pivotal movement in a plurality of directions including at least first and second directions which are at right angles to each other, a controlled rod supported by said rod support for rotary and linear movement and a pair of spaced, cooperating connecting means on said control lever and said controlled rod for translating pivotal movement of said control lever in said first direction into rotary movement of said controlled rod and also for translating pivotal movement of said control lever in said second direction into linear movement of said controlled rod.

3. In a control linkage, a rod support, a lever support, a controlled rod supported by said rod support for rotary movement about the controlled rod axis and for linear movement in line with the controlled rod axis, a control lever supported by said lever support for pivotal movement in a plurality of directions including a first direction transverse to the controlled rod axis and a second direction directed longitudinally of the controlled rod axis and shifting pivotal movement connection means operatively connecting said control lever and controlled rod operable to provide a pivotal movement translating connection located at a substantial distance from the controlled rod axis when said shift lever is pivoted in said first direction and to provide a pivotal movement translating connection which intersects the controlled rod axis when said control lever is pivoted in said second direction.

4. In a control linkage, a rod support, a lever support, a controlled rod mounted on said rod support for rotary movement about the axis of said controlled rod and linear movement in line with the axis of said controlled rod, a control lever mounted on said lever support for pivotal movement about a pivot point spaced from the axis of said controlled rod and in directions transverse and longitudinal of the axis of said controlled rod, a pair of pivot means for alternately translating movement from said control lever to said controlled rod, one pivot means being responsive to pivotal movement of said control lever in the transverse direction to translate movement from said control lever to said controlled rod at points radially spaced from the axis of said controlled rod while the other pivot means does not translate movement between said control lever and controlled rod and said other pivot means being responsive to pivotal movement of said control lever in the longitudinal direction to translate movement from said control lever to said controlled rod at points always at least proximate to the axis of said controlled rod while said one pivot means does not translate movement between said control lever and controlled rod.

5. In a transmission control linkage, a lever support, a rod support, a shift lever pivotally mounted on said lever support for pivotal movement about a pivot point, a control rod rotatably and reciprocally mounted on said rod support, said shift lever having a pair of spherical portions spaced at different radii from said pivot point, socket means on said control rod including a first socket receiving the socket at the largest radius permitting rotary movement of said control rod when said shift lever is pivoted in one direction and imparting linear movement to said control rod when said shift lever is pivoted in another direction at right angles to said one direction and said socket means including a second socket receiving the spherical portion at the smallest radius permitting linear movement of said control rod when said shift lever is pivoted in said another direction and imparting rotary movement to said control rod when said shift lever is pivoted in said one direction.

6. The transmission control linkage set forth in claim 5 and said largest radius corresponding to the shortest distance between said pivot point and the control rod axis.

7. In a transmission control linkage, a lever support, a rod support, a shift lever pivotally mounted on said lever support for universal pivoting about a pivot point, a control rod rotatably and reciprocally mounted on said rod support, said shift lever having a first spherical portion located relative to said pivot point at a radius corresponding to the distance between said pivot point and the control rod axis, said shift lever having a second spherical portion located relative to said pivot point at a radius shorter than the radius of said first spherical portion, said control rod having a double socket member providing first and second sockets, said first socket receiving said first spherical portion and permitting rotary movement of said control rod when said shift lever is pivoted in a first place transverse to the control rod axis and imparting linear movement to said control rod when said shift lever is pivoted in a second plane parallel to the control rod axis and said second socket receiving said second spherical portion and permitting linear movement of said control rod when said shift lever is pivoted in said second plane and imparting rotary movement to said control rod when said shift lever is pivoted in said first plane.

8. In a transmission control linkage, a lever support, a rod support, a shift lever pivotally mounted on said lever for universal pivoting about a pivot point, a control rod rotatably and reciprocally mounted on said rod support, said shift lever having a first spherical portion located at a radius from said pivot point a distance corresponding to the distance between said pivot point and the control rod axis, said shift lever also having a second spherical portion located at a radius from said pivot point shorter than the radius of said first spherical portion, a double socket member rigidly secured to one end of said control rod and having first and second socket means, said first socket means having opposite side walls which are parallel to each other and extend at right angles to the control rod axis and are arranged to engage opposite sides of said first spherical portion at points traced by an arcuate path which at least touches the control rod axis and said second socket means having opposing side walls which are parallel to each other and extend parallel to the control rod axis and are arranged to engage opposite sides of said second spherical portion at points traced by an arcuate path about the control rod axis.

References Cited by the Examiner

UNITED STATES PATENTS

| 2,250,820 | 7/1941 | Backus | 74—473 |
| 2,819,626 | 1/1958 | Stump | 74—473 |
| 3,064,493 | 11/1962 | Popovitch et al. | 74—473 |

MILTON KAUFMAN, *Primary Examiner.*

UNITED STATES PATENT OFFICE
CERTIFICATE OF CORRECTION

Patent No. 3,264,892                      August 9, 1966

William H. Boman et al.

It is hereby certified that error appears in the above numbered patent requiring correction and that the said Letters Patent should read as corrected below.

Column 1, line 32, after "pivot" insert -- point --; column 2, line 41, for "in" read -- to --; column 5, line 12, after "direction" insert -- directed --; column 6, line 22, for "place" read -- plane --; line 32, after "lever" insert -- support --; line 42, for "opposite" read -- opposing --.

Signed and sealed this 22nd day of August 1967.

(SEAL)
Attest:

ERNEST W. SWIDER
Attesting Officer

EDWARD J. BRENNER
Commissioner of Patents